(12) United States Patent
Driggs (10) Patent No.: US 10,264,731 B2
(45) Date of Patent: Apr. 23, 2019

(54) BALE HANDLING AND FEEDING APPARATUS AND ASSOCIATED METHODS

(71) Applicant: Leland Driggs, Eureka, MT (US)

(72) Inventor: Leland Driggs, Eureka, MT (US)

(*) Notice: Subject to any disclaimer, the term of this patent is extended or adjusted under 35 U.S.C. 154(b) by 0 days.

(21) Appl. No.: 15/468,914

(22) Filed: Mar. 24, 2017

(65) Prior Publication Data

US 2018/0271023 A1    Sep. 27, 2018

(51) Int. Cl.
*B60P 1/48* (2006.01)
*A01D 90/10* (2006.01)
*A01D 85/00* (2006.01)
*A01D 90/04* (2006.01)

(52) U.S. Cl.
CPC ........... *A01D 90/10* (2013.01); *A01D 85/005* (2013.01); *A01D 90/04* (2013.01); *A01D 2085/008* (2013.01)

(58) Field of Classification Search
CPC .... A01D 87/126; A01D 90/08; A01D 85/005; A01D 90/105
See application file for complete search history.

(56) References Cited

U.S. PATENT DOCUMENTS

| | | |
|---|---|---|
| 3,195,913 A | 7/1965 | Hallsworth |
| 3,233,765 A | 2/1966 | Barnes |
| 3,376,987 A | 4/1968 | Lohse |
| 3,398,984 A | 8/1968 | Ajero |
| 3,595,409 A | 7/1971 | Bowman-Shaw |
| 3,790,013 A * | 2/1974 | Smith ...................... B66F 9/082 414/469 |
| 3,826,389 A | 7/1974 | Godfrey et al. |
| 3,942,651 A | 3/1976 | Neely, Jr. |
| 4,008,818 A | 2/1977 | Neely, Jr. |
| 4,068,804 A * | 1/1978 | Butler ................... A01F 29/005 239/651 |
| 4,249,843 A | 2/1981 | Kerr |

(Continued)

FOREIGN PATENT DOCUMENTS

| | | |
|---|---|---|
| CA | 1011297 | 2/1975 |
| CA | 1201690 | 2/1975 |
| FR | 2560488 | 3/1984 |

OTHER PUBLICATIONS

J. A. Freeman & Son, Inc. brochure, "Freeman Big Bale Roadsider", on sale before May 5, 1994.

*Primary Examiner* — Gregory W Adams
(74) *Attorney, Agent, or Firm* — Wells St. John. P.S.

(57) ABSTRACT

Bale handling apparatus and associated methods are described. According to one aspect, a bale handling apparatus includes a primary chassis frame, wheels coupled with the primary chassis frame, a grapple system supported by the primary chassis frame, wherein the grapple system includes a plurality of grapples which move between open and closed positions, a hoist assembly supported by the primary chassis frame, wherein the hoist assembly comprises a load bed, and a lift device configured to move the load bed between a first position and a second position, wherein the grapples are configured to move from the open position to the closed position to engage a bale of a vertically arranged stack which is adjacent to the load bed positioned in the second position, and wherein the lift device moves the load bed from the second position to the first position with the grapples engaged with the bale.

20 Claims, 6 Drawing Sheets

(56) References Cited

U.S. PATENT DOCUMENTS

| | | | |
|---|---|---|---|
| 4,329,101 A | 5/1982 | Green et al. | |
| 4,426,183 A | 1/1984 | Butler | |
| 4,427,090 A | 1/1984 | Fredriksen et al. | |
| 4,619,570 A | 10/1986 | Siebenga | |
| 4,971,504 A | 11/1990 | Klompien | |
| 5,211,345 A | 5/1993 | Siebenga | |
| 5,236,294 A | 8/1993 | Willis | |
| 5,333,981 A | 8/1994 | Pronovost et al. | |
| 5,405,229 A | 4/1995 | Tilley et al. | |
| 5,542,803 A * | 8/1996 | Driggs | A01D 90/08 414/111 |
| 5,813,616 A * | 9/1998 | Vandervalk | A01F 29/005 241/101.76 |
| 5,997,233 A * | 12/1999 | Whatley | A01D 90/10 414/25 |
| 6,116,838 A * | 9/2000 | Whatley | A01D 90/10 414/25 |
| 6,171,047 B1 * | 1/2001 | Vandervalk | A01D 87/126 414/111 |
| 6,764,274 B2 * | 7/2004 | Maclay | A01D 87/126 414/111 |
| 6,945,385 B2 * | 9/2005 | Ackerman | A01D 90/08 198/468.2 |
| 6,997,663 B2 * | 2/2006 | Siebenga | A01D 85/005 414/111 |
| 7,399,153 B2 * | 7/2008 | Koehn | A01D 90/08 414/24.5 |
| 8,192,130 B2 * | 6/2012 | Clark | A01D 87/126 241/101.76 |
| 9,113,597 B1 * | 8/2015 | Gonzalez | A01D 85/005 |
| 2004/0022617 A1 * | 2/2004 | Gardner | B60P 1/483 414/789.7 |
| 2010/0266369 A1 * | 10/2010 | Munro | A01D 90/083 414/24.5 |

\* cited by examiner

BALE HANDLING AND FEEDING APPARATUS AND ASSOCIATED METHODS

TECHNICAL FIELD

This disclosure relates to bale handling apparatus and associated methods.

BACKGROUND OF THE DISCLOSURE

Agricultural products, such as hay, are often baled for storage, handling and transportation. The bales may be arranged in stacks where the bales are arranged vertically with respect to the ground. The bales are usually large in size, such as approximately four feet across, four feet high and eight feet long and weighing approximately one ton each, although the bales may be larger or smaller. Larger bales reduce the time previously required to produce and handle the individual bales. However, some larger bales are much too heavy to permit manual gathering, stacking and feeding, and over time the stacks of bales may lean somewhat or otherwise become unstable.

At least some aspects of the disclosure are directed towards improved apparatus and methods of handling bales of agricultural products.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

The present disclosure relates to bale handling apparatus and methods for gathering and stacking bales, stack retrieving, stack transporting, stack placement and feeding of bales of agricultural products. As discussed below, some embodiments of the apparatus and methods provide retrieval of a vertical stack of bales, lowering the stack to a horizontal position in a stable manner, transporting the stack to a different area, and shredding and feeding of individual bales of a stack to livestock.

The reader is directed to the Bale Picker and Stacker described in U.S. Pat. No. 5,542,803 issued to the inventor hereof and the teachings of which are incorporated by reference herein. The bale handling apparatus and methods of the example embodiments described below are able to perform bale picking and stacking operations as well as additional operations including retrieval, transportation and placement of bale stacks and feed operations including dispersing contents, such as hay, of the bales to the ground. Additional details regarding these and other aspects of the bale handling apparatus and associated methods are described below in example and illustrative embodiments.

Although some embodiments of the present disclosure are described with respect to baled hay, it is to be understood that the disclosed apparatus and associated methods are not limited to handling of hay bales and may be utilized to handle bales of other agricultural products in other implementations.

In example embodiments, the bale handling apparatus is configured as one or more of a bale picker, bale stacker, stack retriever/transported/placer and livestock feeder system. The bale handling apparatus allows picking of bales to form stacks, deposit bale stacks directly to a surface, such as the ground, retrieving and transporting bale stacks, and feeding bales of the stacks according to example embodiments herein.

The bale handling apparatus may be implemented as a complete self-powered vehicle in some arrangements discussed below. The operators cab may be situated along one side of the apparatus for picking, stacking, retrieving, placement and feeding of bales. The cab may be moved to allow a feed assembly to be attached to the apparatus and facilitate accuracy in maneuvering and operation of the apparatus. For example, the cab may be positioned such that the bale picking, stack retrieval, transporting, placement and feeding is in front of the operator making the functions faster, safer and more accurate compared with other arrangements.

Figure 1:
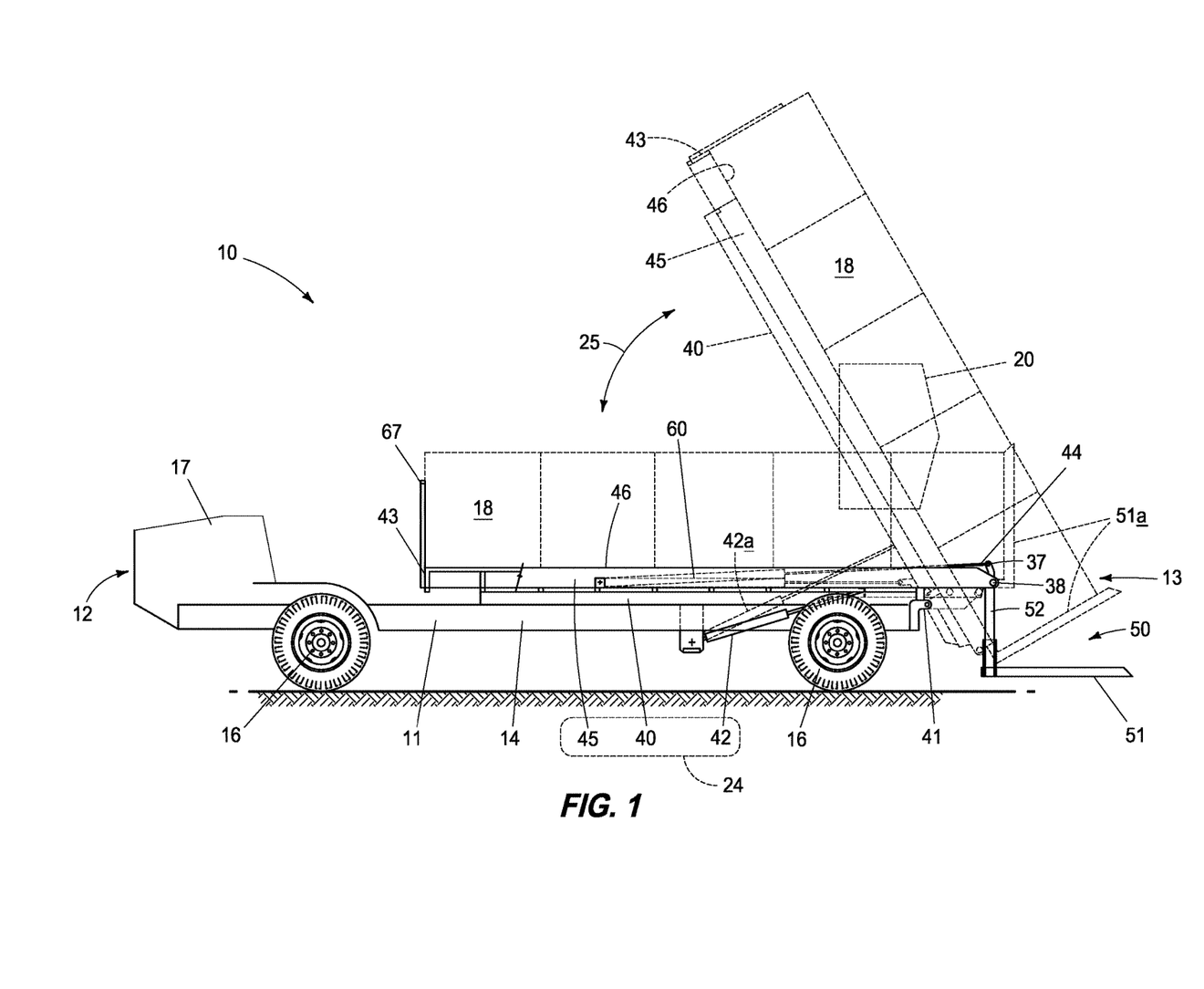
FIG. 1 is a side elevation view of a bale handling apparatus according to one embodiment.
Figure 2:
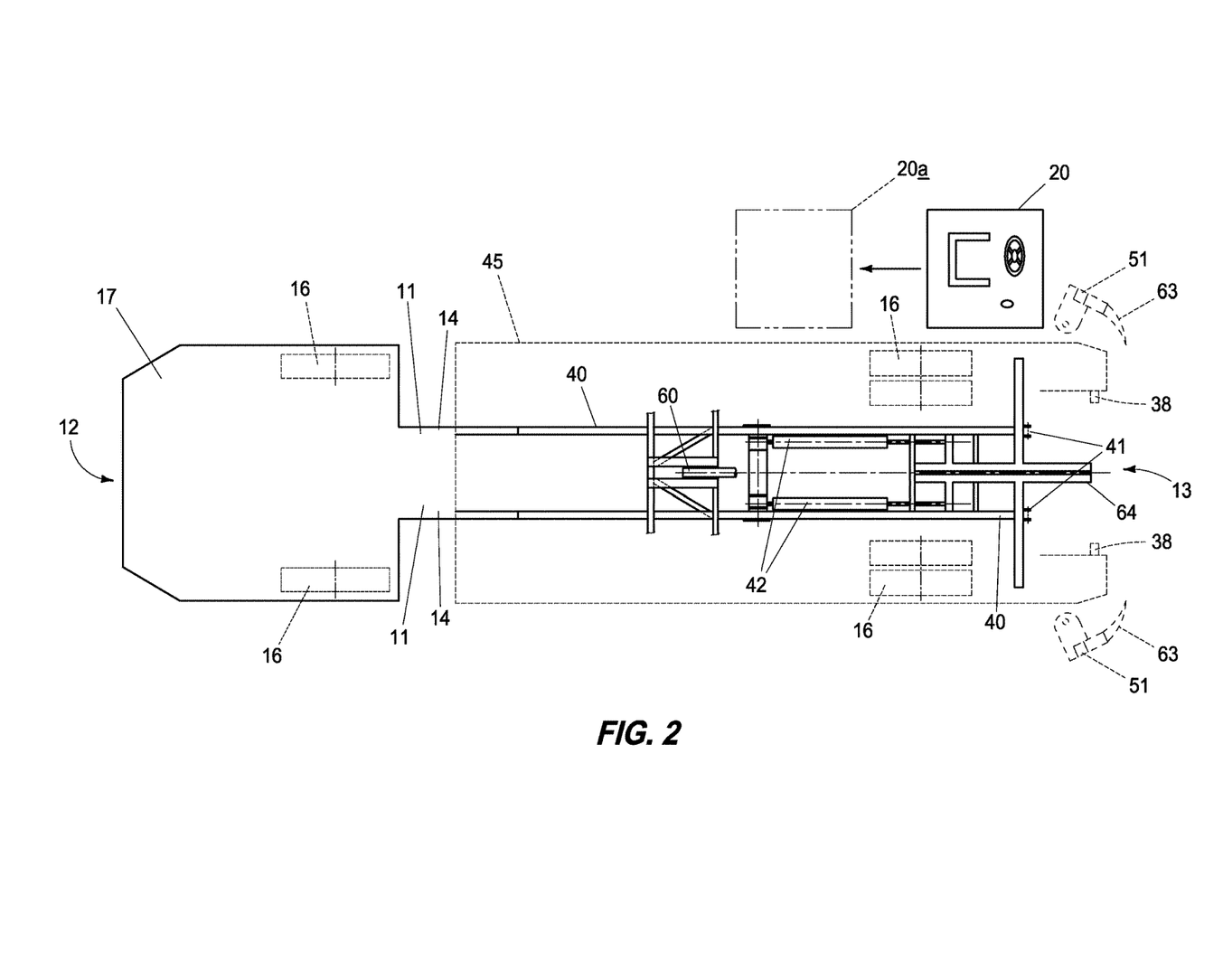
FIG. 2 is a top view of a hoist frame of a bale handling apparatus according to one embodiment.

Referring to FIGS. 1 and 2, one embodiment of a bale handling apparatus 10 is shown. As described below, apparatus 10 is configured to pick bales 18 of hay or other baled product from a field, arrange the bales 18 in a horizontal stack, and then deposit the bales 18 in a vertical stack at a desired location. The apparatus 10 may also be operated to pick vertical stacks of bales 18 and to move the stack to another location and/or surface, such as the ground or an elevated surface above the ground (e.g., a trailer bed). As described below, the apparatus 10 may also be operated with a feed assembly for delivery of hay or other product directly to the field for large feeding operations.

In the illustrated embodiment, bale handling apparatus 10 includes a primary chassis frame 11 including an engine end 12 and an operational end 13. The primary chassis frame 11 is constructed of rigid steel frame members including side rail members 14 in one embodiment. Wheels 16 on an undercarriage are coupled with and support the primary chassis frame 11 as well as provide movement of apparatus 10 along a ground surface. At least two of the wheels are steerable by the operator and one of the wheels 16 is driven in one embodiment (e.g., the steering wheels 16 are positioned adjacent to engine end 12 and the driving wheels 16 are situated at the operational end 13). As mentioned above, some embodiments of bale handling apparatus 10 are implemented as self-powered vehicles which may be driven upon fields for bale handling operations as well as upon roads, for example, for travel to the fields.

A drive train 17 is mounted to the primary chassis frame 11 and is connected to driven wheels 16 an include an engine, transmission and differential components. The drive train 17 powers at least two of the wheels 16 to move the apparatus 10 along the ground surface in one embodiment.

A control cab 20 is supported by the primary chassis frame 11 and includes a steering controller for operating the steering wheels 16 via a hydraulic steering mechanism which controls directional movement of apparatus 10. Control cab 20 additional includes other controls for allowing control of operations of the apparatus 10 to implement bale handling operations described herein.

Control cab 20 is mounted on a sliding frame (not shown) to the primary chassis frame 11 which allows movement of the cab 20 between a first position during picking and stacking operations (shown as solid in FIG. 2) and a second position during feeding operations (shown as dashed with reference 20a in FIG. 2). The movement of the cab 20 provides the operator at different positions to facilitate different operations being performed by the apparatus 10 at different times. In one embodiment, the cab 20 is positioned forward in the direction of bale pick-up and feeding. The different locations of the control cab 20 allows single point operation for not only the movement of the apparatus 10 along a ground surface but also the selective operations of the picking, stacking and feeding equipment.

Bale handling apparatus 10 includes a hoist assembly 24 supported by the primary chassis frame 11 in the illustrated embodiment. The depicted example hoist assembly 24 includes a hoist frame 40, a lift device 42, and a load bed 45. Hoist frame 40 is mounted to the primary chassis frame 11 by a pivot 41 situated adjacent the operational end 13 and pivot 41 is transverse to the frame 11 and defines a horizontal, transverse pivot axis. The pivot mounting enables the hoist frame 40 and load bed 45 to be moved 25 between a first, at least substantially horizontal position shown in FIG. 1 and a second, at least substantially vertical position (the vertical position is not shown and hoist frame 40 is shown dashed in FIG. 1 at an intermediate position between the substantially horizontal and vertical positions). The load bed 45 extends from a first end 43 adjacent to the engine end 12 of the primary chassis frame 11 to a second end 44 adjacent to the operational end 13 of the primary chassis frame 11 when the load bed 45 is in the horizontal position. The first end 43 of the load bed 45 is adjacent to the primary chassis frame 11 when the load bed 45 is in the first positon and the first end 43 of the load bed 45 is spaced from the primary chassis frame 11 when the load bed 45 is in the second positon as shown in FIG. 1. The load bed 45 may be at least substantially parallel with the ground and the frame 11 when positioned in the first position and at least substantially perpendicular to the ground and frame 11 when positioned in the second position.

Lift device 42 is mounted between the hoist frame 40 and primary chassis frame 11 for selectively moving the hoist frame 40 between the substantially horizontal position (i.e., lift device 42 retracted) and substantially vertical positions (i.e., lift device is extended as shown by reference 42a). Lift drive 42 is a hydraulic cylinder in one embodiment which is connected to a hydraulic circuit (not shown) and controlled from the cab 20 to selectively lift and lower the hoist frame 40.

In one embodiment, hoist frame 40 is rigid and formed of steel, similar to the primary chassis frame 11. Load bed 45 is also provided as a steel frame in one embodiment shown in FIG. 3 which is supported by hoist frame 40 and provides a bale receiving load bed surface 46 that is substantially flat to engage, receive and/or support a plurality of bales 18 depending upon the positioning of the hoist frame 40. A bale stop frame 67 is provided at the first end 43 of load bed 45 to prevent over extension of bales 18 from the load bed surface 46 in the depicted embodiment.

As mentioned above, apparatus 10 may be utilized to pick up individual bales 18 from the ground. The individual bales 18 are placed upon the load bed surface 46 while the load bed 45 is in the horizontal position (or upon feed bed 35 and feed table 71 if installed upon apparatus 10 as discussed below). In one embodiment, apparatus 10 includes a grapple system 50 which is mounted and secured to the hoist bed 40 at the operational end 44 for engaging and lifting bales 18 onto and from the load bed surface 46. In one embodiment, the grapple system 50 is substantially "L" shaped in the side view of FIG. 1 with parallel frame members 52 and parallel grapples 51 which extend outward from frame members 52. Grapples 51 are each mounted on a rotating assembly as described below. The load bed 45 includes plural outwardly extending side rollers 38 which are received within channels of frame members 52.

The grapples 51 may be rotated between open and closed positions as discussed below and grapples 51 are provided in the closed position to engage and grasp opposing sides of an individual bale 18 from the ground and lift it onto a desired position on the load bed surface 46. The grapple system 50 is moveable with respect to load bed 45 between a first lowered position (shown solid in FIG. 1) wherein the grapples 51 are substantially parallel to and offset toward the ground surface from the load bed surface 46 and a second upper position (shown dashed as reference 51a in FIG. 1) wherein the grapples 51 are substantially perpendicular to the load bed surface 46.

Figure 3:
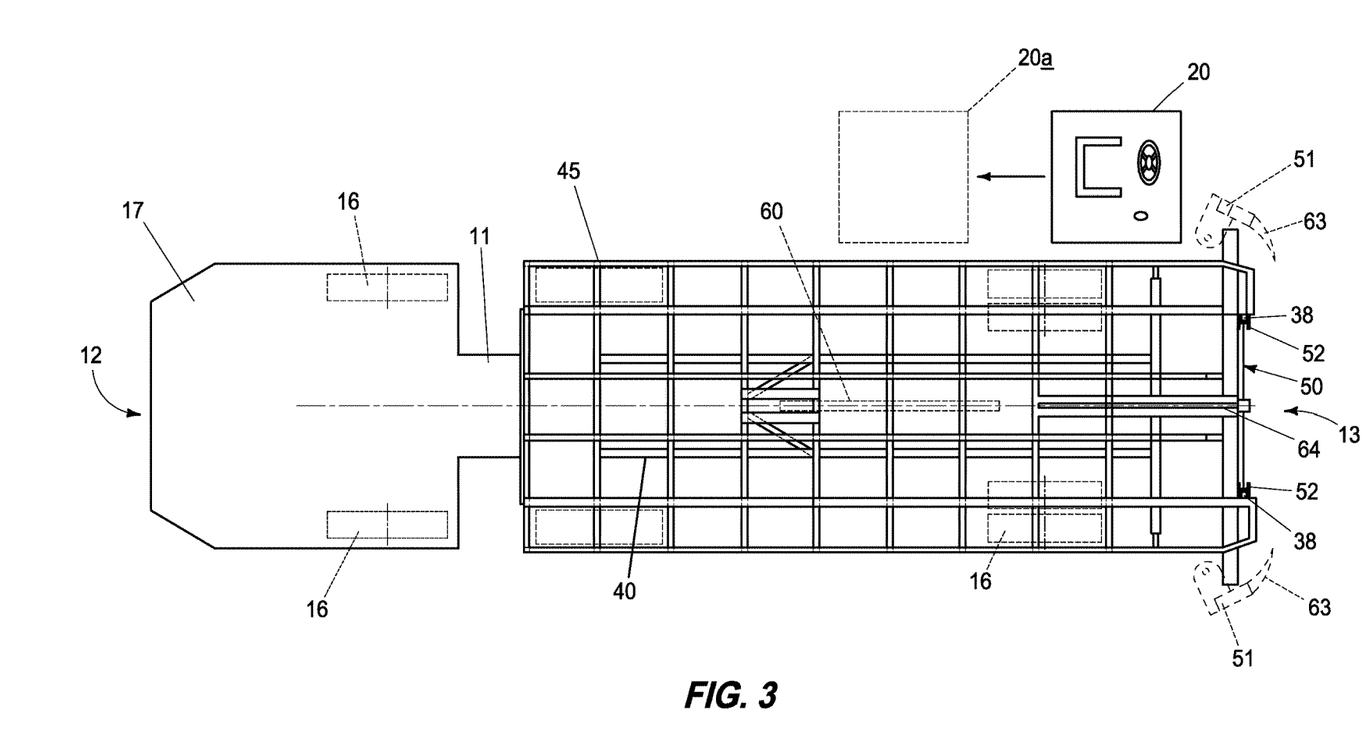
FIG. 3 is a top view of a load bed of a bale handling apparatus according to one embodiment.

To facilitate the above positioning of the grapple system 50, the frame members 52 of the grapple system 50 receive side rollers 38 which extend outwardly from load bed 45 as shown in FIG. 3. Movement of the grapple system 50 between the first and second positions is effected by a driver 60 which is mounted between the hoist frame 40 and grapple system 50. In one embodiment, the driver 60 is a hydraulic cylinder mounted to the hoist frame 40 and connected in a hydraulic circuit which is controlled by appropriate valving from the cab 20. Extension of the driver 60 provides the grapple system 50 in the first position of FIG. 1 while retraction of the driver 60 provides the grapple system 50 in the second position of FIG. 1.

Figure 4:
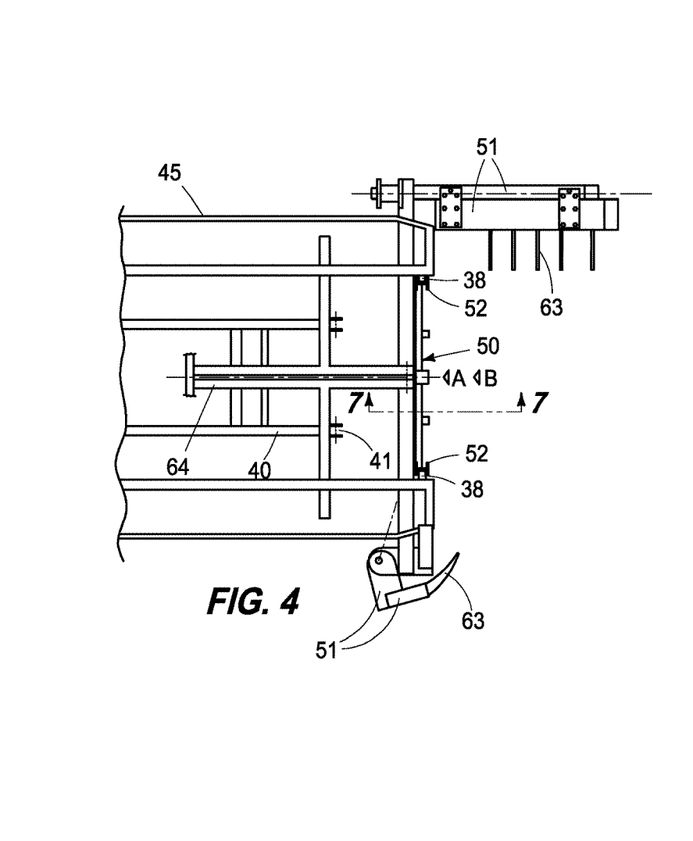
FIG. 4 is an illustrative representation of a grapple system according to one embodiment and shows grapples in lowered and upper positions.

Additional details of grapple system 50 are shown in shown in FIGS. 4-7. Referring initially to FIG. 4, the grapple system 50 is shown with the upper grapple 51 of FIG. 4 in the first (lowered) position and the lower grapple 51 of FIG. 4 in the second (upper) position. FIG. 4 is for illustrative purposes and the grapples 51 are provided in fixed parallel arrangement with respect to one another in the described embodiment and are both provided simultaneously in the first or second positions or intermediate positions therebetween during operation of one example embodiment.

Figures 5, 7:
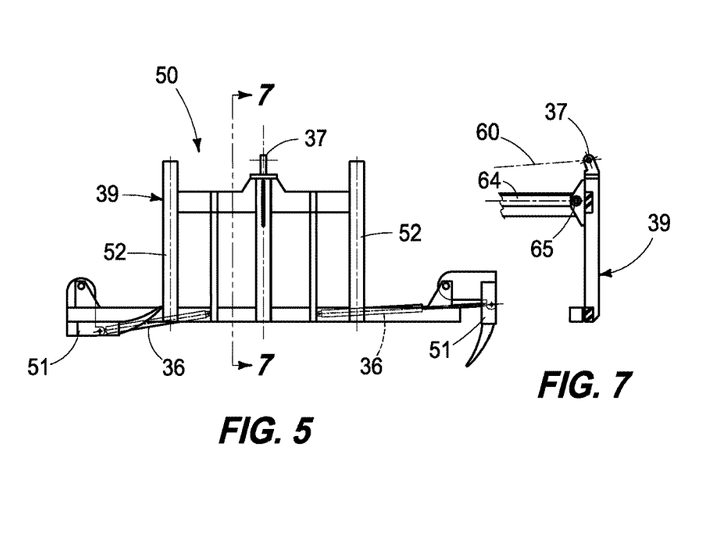
FIG. 5 is an elevation view of one embodiment of a grapple system from the operational end of the bale handling apparatus at a location "A" of FIG. 4.
FIG. 7 is a cross-sectional view taken along line "C-C" of FIG. 4.

FIG. 5 is an elevation view taken at position "A" of FIG. 4 and which shows a grapple frame 39 which includes the grapple frame members 52 connected with the grapples 51. The driver 60 is coupled with an upper portion of the grapple frame 39 at a pivot coupling 37.

Figure 6:
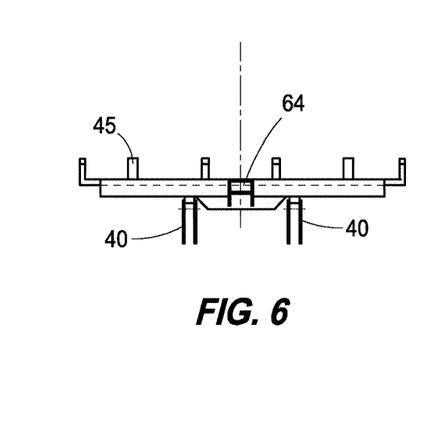
FIG. 6 is an elevation view of one embodiment of the bale handling apparatus from the operational end of the bale handling apparatus at a location "B" of FIG. 4 and with the grapple system removed.

FIG. 6 is an elevation view taken at position "B" of FIG. 4 with the grapple system 50 omitted. A guideway 64 is shown which is coupled with and supported by the hoist frame 40 and substantially parallel with load bed surface 46.

FIG. 7 is a cross-sectional view taken along the line "C-C" shown in FIG. 4. FIG. 7 depicts the driver 60 connected to the grapple frame 39 via the pivot coupling 37. In addition, grapple frame 39 includes a center roller 65 which is received within guideway 64 and guideway 64 operates to support and guide linear movement of the center roller 65 of the grapple system 50 along the longitudinal length of guideway 64 during extension and retraction of the driver 60 and provision of the grapple system 50 in the first and second positions.

As mentioned above, channels of frame members 52 receive side rollers 38 of the load bed 45 and the side rollers 38 operate to support and guide grapple frame 39 during movement between the first and second positions. Extension of the driver 60 causes the grapples 51 to move from an at least substantially vertical arrangement in the upper position to an at least substantially horizontal arrangement in the lower position. The grapple system 50 may be returned to the vertical arrangement by retraction of the driver 60.

More specifically, extension of the driver 60 causes the grapple system 50 to move toward the operational end 13 of the apparatus 10 and swing downwardly as its weight becomes cantilevered at the operational end 13. Stops within the channel members 52 contact the side rollers 38 which stops movement of the grapple system 50 toward the operational end 13. The grapple system 50 swings downwardly until the grapples 51 are substantially parallel and adjacent to the ground surface. Retraction of the driver 60 causes the grapple system 50 to swing over the side rollers 38 with the grapples 51 swinging upwardly and the center roller 65 prevents the grapples 51 from simply "climbing" the side rollers 38 and subsequently dropping downwardly.

During picking operations, the grapple system 50 is provided in the lowered position such that grapples 51 can engage a bale upon the ground and lift the bale onto the load bed 45 by retraction of driver 60 to form a horizontal stack of bales upon load bed surface 46. Additional details regarding picking of bales to form a stack are described in U.S. Pat. No. 5,542,803 incorporated by reference above.

The distance travelled by the grapple system 50 between the first and second positions is determined by the stroke length of driver 60 and the corresponding length of the guideway 64. This dimension is sufficient in some embodiments to enable the grapples 51 of the grapple system 50 positioned in the upper position to hold a stack of bales on the load bed 45 when hoist frame 40 is pivoted vertically to enable loading of the stack onto an elevated surface, such as the bed of a truck.

Grapples 51 are moveable between open and closed positions to either disengage or grasp and engage a bale. Referring to FIG. 5, the right grapple 51 is shown in the open position while the left grapple 51 is shown in a closed position. The positioning of the grapples 51 in different positions in FIG. 5 is illustrative since both grapples 51 are typically simultaneously provided in the same open or closed positions. The grapples 51 are closer together in the closed position to engage a bale compared with the open position. Respective drivers 36, such as hydraulic cylinders, are controlled via operator control to operate the grapples 51 between the open and closed positions. The grapples 51 are provided in the closed position to engage and enable movement of a bale while grapples 51 are provided in the open position to dis-engage a bale following desired placement of the bale, for example, on the load bed surface 46 and to enable the grapple system 50 to engage another bale.

Accordingly, in one embodiment, grapple system 50 may be provided in the lowered position and the grapples 51 may be provided in an open position to engage and grasp an individual bale on the ground. Thereafter, the grapples 51 may be moved to a closed position to engage the bale and the grapple system 50 may be moved to the upper position to place the engaged bale upon the load bed surface 46. Thereafter, the grapples 51 may be opened to disengage the bale and grapple system 50 may thereafter be moved to the lowered position and the apparatus 10 moved to engage and retrieve another bale which may be placed on the load bed surface 46. These picking operations of individual bales forms a horizontal stack of bales upon the load bed surface 46 and the apparatus 10 may be moved to transport the stack of bales to a desired location.

Grapples 51 may also include a plurality of removable forks 63. Forks 63 extend under the opposing ends of a bale when the grapples 51 are moved to the closed position to assure firm engagement of the grapple system 50 with the bale. The forks 63 are typically used during retrieval, transportation and placement of stacks of bales and feeding operations described below and forks 63 are typically removed from the grapples 51 during picking and stacking operations in one embodiment.

The grapples 51 and grapple system 50 may be used to perform picking and stacking operations as described above as well as additional operations with respect to bale handling. For example, the grapples 51 may be used to engage the lowermost bale of a vertical stack for stabilization of the stack during stack retrieval from the ground and placement including movement of the load bed 45 engaged with the stack of bales between horizontal and vertical positions. In addition, grapples 51 may engage the same bale when the load bed 45 is in the horizontal position, for example during transportation of the bale stack from a first location to a second location. In one embodiment, grapples 51 move from the open position to the closed position to engage a bale of a vertical stack adjacent to the load bed 45 in the vertical position and the stack may be lowered to a horizontal arrangement and supported by load bed 45. In some embodiments discussed in additional detail below, apparatus 10 includes a feed assembly and grapple system 50 may be used to assist with feeding operations performed by apparatus 10.

Additional operational details of bale picking and stacking by apparatus 10 according to example embodiments are described below. Example operations begin with the apparatus 10 in an empty condition and with the cab 20 in the operational position shown in FIG. 1 to provide maximum visual control of the operations during picking and stacking. The operator drives the apparatus 10 to the area from which bales are to be gathered and maneuvers the apparatus 10 toward a selected bale and adjusts the hydraulic system to provide the grapple system 50 in the lowered position where the grapples 51 are adjacent to the ground surface. The grapples 51 are initially provided in the open position as the apparatus 10 approaches the individual bale and the grapples 51 are thereafter moved to the closed position to engage and grasp the individual bale upon the ground. The hydraulics are controlled to retract the grapple system 50 which lifts the bale up onto the load bed surface 46. Once the bale is deposited upon the load bed surface 46, the grapples 51 are moved to the open position to dis-engage the bale, the apparatus 10 may be moved into an appropriate position to retrieve another bale upon the ground, and the grapple system 50 is lowered again and the process is repeated to move the bale to the load bed surface 46. This process continues until the desired number of bales is deposited onto the load bed surface 46 in a horizontal stack. The grapples 51 may remain engaged with the last bale placed upon surface 46 to secure the stack upon the load bed 45. The loaded apparatus 10 may now be driven to a location where the bales on the load bed 45 are to be vertically stacked.

Once the apparatus 10 is provided at the point of stacking, the operator raises the hoist frame 40 by selective operation of its respective hydraulics. The grapples 51 remain engaged with a bale of the stack during the tilting of the hoist frame 40 and load bed 45 to a vertical position, thus tipping the stack of bales into a vertical orientation. The apparatus 10 may now be finely maneuvered into the final position for stacking of the bales upon the ground or an elevated surface. Once the stack is placed, the grapples 51 are moved to the open position to dis-engage the lowermost bale of the vertical stack. If the vertical stack of bales is to be deposited onto an elevated surface, such as the bed of a truck or trailer, the operator controls the driver 60 of the grapple system 50 to retract to increase the elevation of the lowermost bale held between the grapples 51 of a vertical stack of bales. The elevation change provides ample clearance for the vertical stack of bales to be maneuvered over an elevated surface. Once the bale stack is in position and placed upon the elevated surface, the grapples 51 are moved to the open position to dis-engage the bale to allow the apparatus 10 to be moved to retrieve additional stacks or bales.

Figure 8:
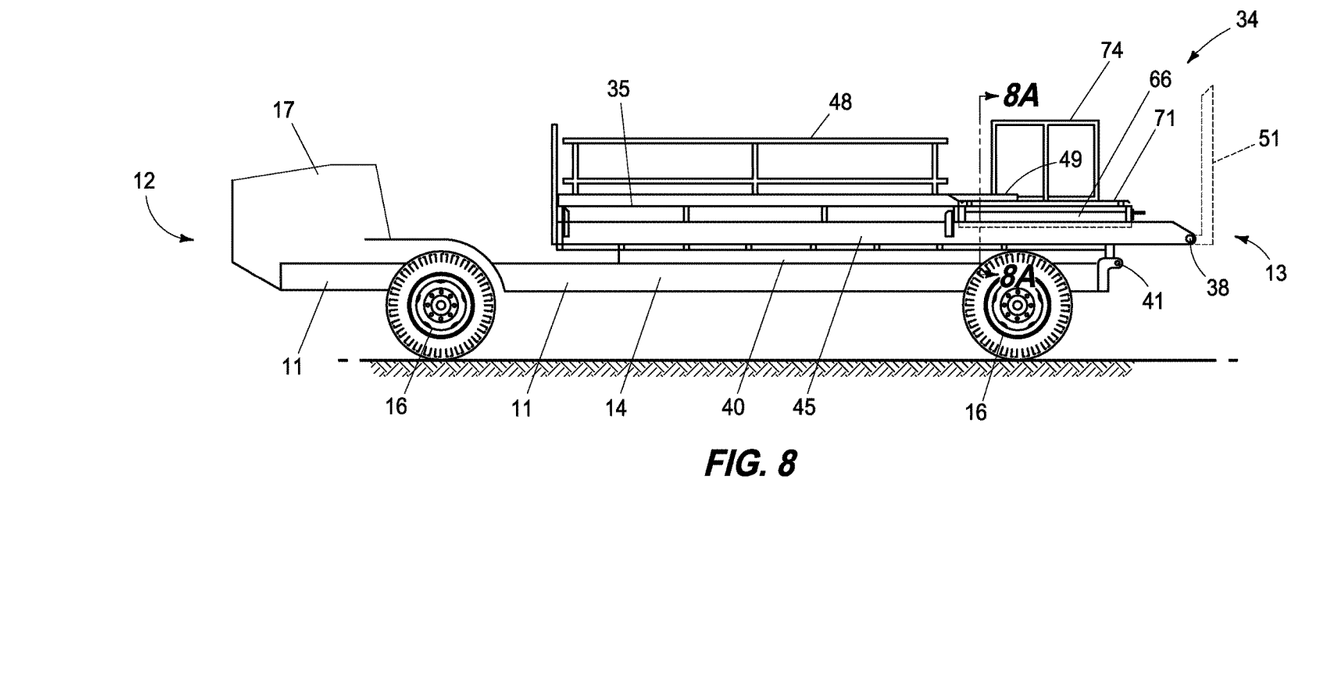
FIG. 8 is a side elevation view of a bale handling apparatus with a feed assembly according to one embodiment.
Figure 8A:
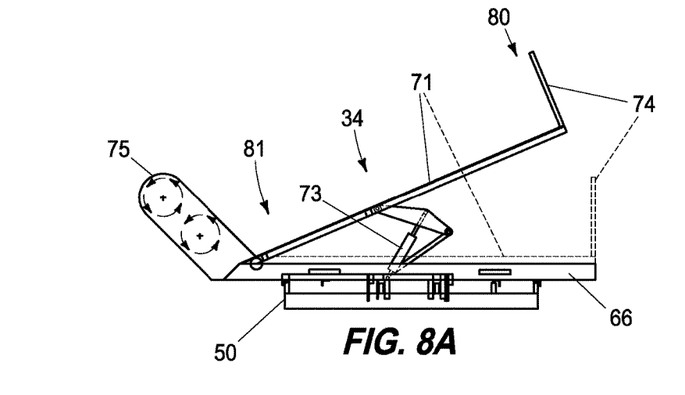
FIG. 8A is a cross-sectional view taken along line "A-A" of FIG. 8 of the feed assembly according to one embodiment.
Figure 9:
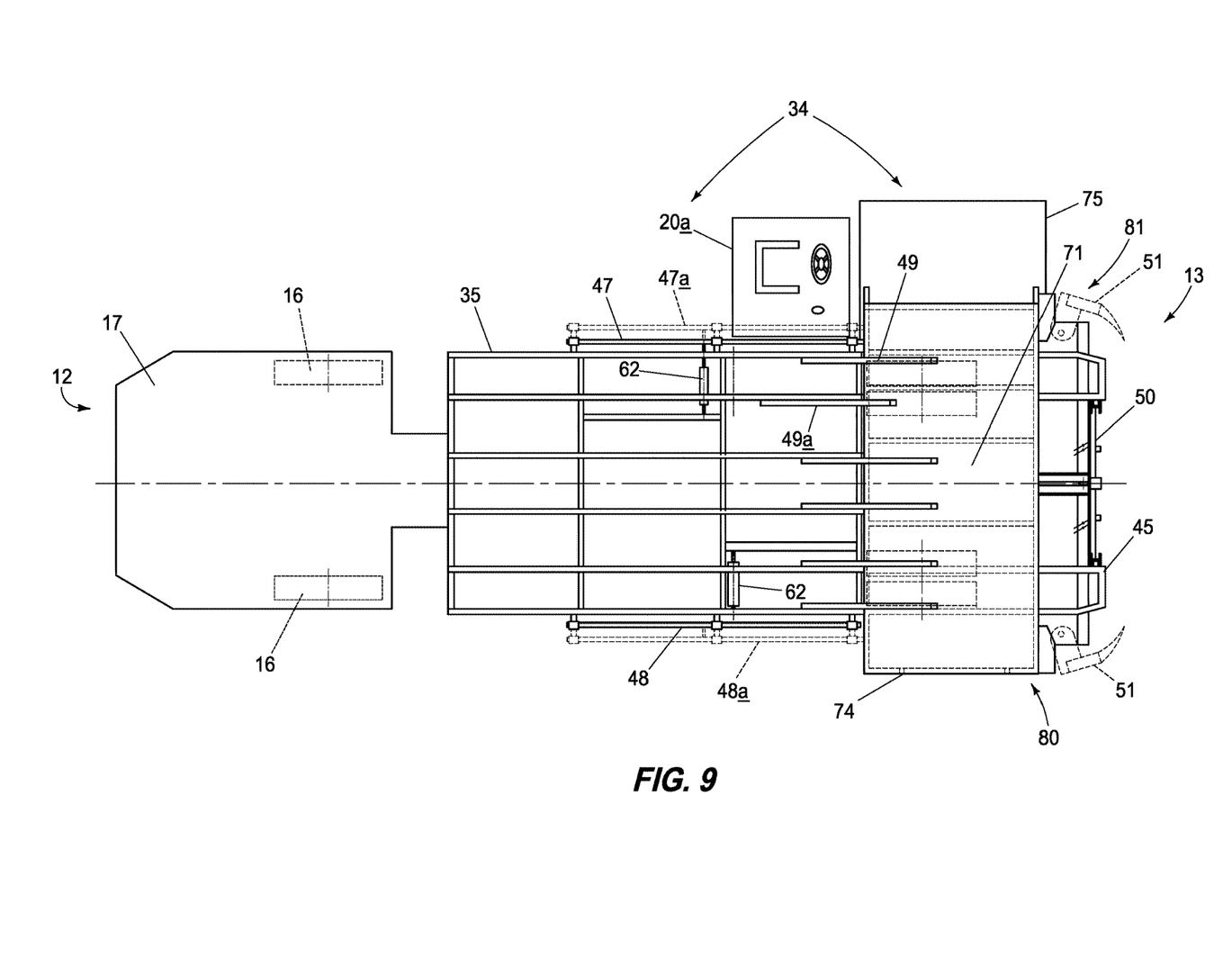
FIG. 9 is a plan view of a bale handling apparatus with a feed assembly according to one embodiment.

Referring to FIGS. 8, 8A and 9, example operations performed by apparatus 10 with respect to handling bales for feeding livestock are described. In one embodiment, apparatus 10 includes a feed assembly 34 which may be removably attached to bale handling apparatus 10 when feeding of livestock is to be implemented, and removed from apparatus 10 and stored when feeding operations are not implemented.

Feed assembly 34 includes a feed bed 35, a plurality of squeeze members 47, 48, a feed table frame 66, a feed table 71 and a lift device 73 in one embodiment. Feed bed 35 is fabricated of steel and attached with angles and bolts to the load bed 45. In addition, feed table frame 66 and feed table 71 are installed upon the load bed 45 adjacent to the feed bed 35 and are constructed of steel similar to the feed bed 35. Feed table 71 includes opposing ends 80, 81 and a feed mechanism 75 is mounted to the feed table frame 66 adjacent to second end 81 of feed table 71 in one embodiment. Feed mechanism 75 is configured to receive and shred or otherwise disperse contents of the bales to the ground. The feed mechanism 75 is commercially available from various suppliers.

Referring to FIG. 8A, a lift device 73 in the form of a hydraulic cylinder 73 is coupled with the feed table frame 66 and feed table 71. Upon hydraulic control from cab 20, lift device 73 is configured to lift the first end 80 of feed table 71 from a first horizontal position (shown dashed in FIG. 8A) where the first end 80 is located adjacent to the feed table frame 66, hoist frame 40 and primary frame 11 to a second position where the first end 80 is spaced from the feed table frame 66, hoist frame 40 and primary frame 11.

In one feeding example, a horizontal stack of bales are received upon feed bed 35 and feed table 71 (for example following retrieval of a vertical stack of bales from the ground). The grapples 51 may remain engaged with the bale which is adjacent to the operational end 13 of apparatus 10 following the retrieval operation. Once feeding is to commence, the feed table 71 and grapple system 50 may be moved towards the operational end 13 of apparatus 10 away from feed bed 35 which also causes the bale upon the feed table 71 and which is engaged by grapples 51 to move away from the feed bed 35. In one embodiment, feed table 71 is attached to grapple system 50 and driver 60 may be used to adjust the position of the feed table 71 relative to feed bed 35.

As shown in FIG. 9, a plurality of adjustable support rails 49 extend away from the feed bed 35 elevationally over a part of the feed table 71 towards the operational end 13 of apparatus 10. The feed table 71 is moved a sufficient distance to the right in FIG. 9 such that the feed table 71 and bale thereon clear the support rails 49. Once the feed table 71 is positioned to the right to clear support rails 49, the lift device 73 is actuated to move the first end 80 of feed table 71 from the first, horizontal position to the second, spaced position.

The feed table 71 is titled with respect to the primary chassis frame 11 when the first end 80 of the feed table 71 is positioned at the second position. The tilting of the feed table 71 directs the individual bale upon the feed table 71 towards feed mechanism 75 which is located adjacent to second end 81 of the feed table 71 and which is configured to disperse the contents of the bale to the ground. In one embodiment, the surface of the feed table 71 is smooth and has a low coefficient of friction to allow the bales to freely slide into the feed mechanism 75 for feeding. In one embodiment, the surface of the feed table 71 is a layer of low friction poly material to promote sliding of the bales upon feed table 71. A bale stop 74 constructed of steel components may be attached to the feed table 71 adjacent to the first end 80 which restricts the movement of bales off the first end 80.

In some embodiments, a plurality of squeeze members 47, 48 are pivotally mounted by lubricated bearing supports to the feed bed 35 adjacent to elongated lateral sides of the load bed 45 and feed bed 35 as shown in FIG. 9. Squeeze members 47, 48 are implemented as steel frames in one embodiment. Respective drivers 62 in the form of hydraulic cylinders are connected between the feed bed 35 and respective squeeze members 47, 48 in the illustrated embodiment. Drivers 62 operate to selectively move the squeeze members 47, 48 between closed positions and open positions in response to control from the operator (the open positions of squeeze members are shown dashed as references 47a, 48a in FIG. 9). The squeeze members 47, 48 are closer together in the closed position compared with the open position.

Feed bed 35 is configured to engage at least some of the bales of a vertical bale stack when positioned in a substantially vertical position via lift device 42 during retrieval of the stack of bales. Following placement of the feed bed 35 adjacent to the vertical bale stack, the squeeze members 47, 48 are provided in the closed position to engage and stabilize one or more of the bales securely on the feed bed 35 while the hoist frame 40 is lowered to the horizontal position. In addition, the squeeze members 47, 48 may remain in the closed positions during transportation of a stack of bales upon feed bed 35.

As mentioned above, the squeeze members 47, 48 are pivotally connected to the feed bed 35 and extension of the drivers 62 causes the squeeze members 47, 48 to move from closed positions to the open positions. The squeeze members 47, 48 continuously grasp bales of the stack to prevent the bale stack from prematurely tipping away from the feed bed 35 during stacking and handling procedures.

The grapples 51 and squeeze members 47, 48 may also be provided in closed positions to engage a bale stack upon feed bed 35 and feed table 71 during placement of the bale stack upon a supporting surface, such as the ground, and thereafter the grapples 51 and squeeze members 47, 48 are moved to open positions to dis-engage the placed bale stack. Accordingly, in some embodiments, the feed assembly 34 and grapple system 50 are configured to retrieve and place a vertical stack of bales with respect to the ground.

Additional example operations of the apparatus 10 to perform handling of bales and feeding of baled material, such as hay, grains and supplements are described below. Initially, the feed bed 35 with squeeze members 47, 48, feed table 71, feed table frame 66, and feed mechanism 75 are installed upon the hoist frame 40 and load bed 45. Thereafter, the apparatus 10 is moved to a vertical bale stack upon the ground where the load bed surface 46 in a vertical position contacts the bale stack and the grapples 51 and squeeze engage the lowest bale of the stack. Thereafter, the hoist system 40 and load bed 45 with the bale stack are returned to a horizontal position. The apparatus 10 is then moved into an appropriate location where feeding is to commence.

The feed table 71 having a bale of the stack thereon and the grapple system 50 may be moved towards the operational end 13 of the apparatus a sufficient distance such that the feed table 71 clears the support rails 49 shown in FIG. 9. Thereafter, the grapples 51 dis-engage the bale on feed table 71 and the driver 73 moves the feed table 71 from the first position where the first end 80 of the table 71 is adjacent to feed bed 35 to the second position where the first end 80 is spaced from the feed bed 35 which directs the bale upon the feed table 71 towards the feed mechanism 75 to disperse the contents of the bale to the ground. The apparatus 10 may be driven forward during dispersing of the bale to spread the contents of the bale over a desired area.

Following shredding of the bale, the feed table 71 is lowered to a horizontal position and the grapples 51 are returned to the closed position. Thereafter, the hoist frame 40 may be raised to urge additional bales upon the feed bed 35 and support rails 49 to slide towards the operational end 13 of the apparatus 10 and which deposits one of the bales upon the feed table 71. The feed assembly 34 allows efficient delivery of the baled product directly to livestock with the same apparatus used for picking and stacking bales and retrieving, transporting and placing stacks of bales.

Bales may be made in different sizes and apparatus 10 is configured to accommodate different sizes of bales in some embodiments. In one embodiment, feed table 71 has a width (in the direction from engine end 12 to the operational end 13) which is selected according to the largest size of bales to be handled (i.e., table 71 may be 5 feet wide if bales having a length of 5 feet from the engine end 12 to the operational end 13 are to be handled). When handling such bales, the support rails 49 can be omitted and the raising of the hoist frame 40 directs one bale to the top of the feed table 71. The grapples 51 are provided in the closed position while the hoist frame 40 is raised which operates to stop movement of the bale sliding towards the operational end 13 at a position directly over the feed table 71 which may thereafter be raised to direct the bale to the feed mechanism 75.

Support rails 49 may be adjusted on the feed frame 35 when bales of smaller sizes are to be handled. Furthermore, the lengths of the extensions of the support rails 49 from the feed bed 35 towards the operational end 13 of apparatus 10 may be adjusted to accommodate different sizes of the bales being handled. For example, following the dispersing of a first bale of a stack to the ground, the feed table 71 is lowered and moved towards the engine end 12 to a position adjacent to the feed bed frame 35. Thereafter, the hoist frame 40 is raised to cause the second bale of the stack to move towards the operational end 13 of apparatus 10. The second bale slides towards the operational end 13 until it is stopped by the grapples 51 in the closed position. The movement of the third bale of the stack is stopped by the second bale positioned upon feed table 71 and the third bale rests upon support rails 49. The feed table 71 may be moved towards the operational end 13 and the first end 80 of the feed table 71 is raised to initiate feeding of the second bale. Thereafter, the feed table 71 is lowered and moved towards the engine end 12 and the hoist frame 40 may again be raised to cause the third bale to slide to a position upon the feed table 71 and the process is repeated until the contents of all bales of the stack are dispersed to the ground.

As mentioned above, the grapples 51 may be provided in the closed position to stop the bales sliding towards the operational end 13 while the hoist frame 40 is raised. In one embodiment, if bales of 3 feet in length are being handled, the support rails 49 may be adjusted to extend 2 feet outwardly from feed bed 35. The raising of the hoist frame 40 causes the entirety of one of the bales and two feet of the next bale to be over the feed table 71 which is positioned adjacent to the feed bed 35. Thereafter, the hoist frame 40 is lowered again to its horizontal position and feed table 71 may be moved two feet to the right to clear the extended support rails 49, and thereafter the first end 80 of the feed table 71 is raised to cause the bale upon the feed table 71 to slide into the feed mechanism 75. If bales of 4 feet in length are being handled, the support rails 49 may be configured to extend 1 foot outwardly from feed bed 35. Accordingly, in some embodiments, individual support rails 49 can be adjusted or removed to accommodate the bale sizes. FIG. 9 depicts one support rail 49a at an alternate position with respect to the feed bed 35 compared with the other depicted support rails 49 for illustrative purposes although typically all support rails 49 would be positioned to extend the same outward distance from feed bed 35 during use.

Different embodiments of the apparatus 10 are configured to handle individual bales of different sizes and bales in vertical stacks. Different components of the apparatus 10 including the hoist assembly, load bed, grapple system (and feed bed and feed table if provided) are components of bale handling systems of the example different embodiments of the apparatus 10 which are configured to manipulate and move individual bales or bales arranged in stacks. As further described above, bales arranged in vertical stacks may be retrieved, transported and placed upon the ground or other support surface as well as directed to a feed mechanism 75 by the bale handling systems of the apparatus 10 described herein.

Accordingly, at least some embodiments of apparatus 10 are able to perform different functions with respect to handling of bales, including bale picking, transporting one or more bales, stacking bales, aligning to stacks, retrieval of bale stacks, and feeding. In addition, the positioning of the cab in some embodiments enables the bale handling functions to be performed directly in front of the operator which reduces fatigue and increases safety as well as provides increased speed and precision of all functions.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A bale handling apparatus comprising:
a primary chassis frame;
a plurality of wheels coupled with the primary chassis frame;
a grapple system supported by the primary chassis frame, wherein the grapple system comprises a plurality of grapples which are configured to move between open and closed positions and the grapples are closer to one another while positioned in the closed position compared with being positioned in the open position;
a hoist assembly supported by the primary chassis frame, wherein the hoist assembly comprises:
a load bed; and
a first lift device configured to move the load bed between a first position where a first end of the load bed is adjacent to the primary chassis frame and a second position where the first end of the load bed is spaced from the primary chassis frame;
wherein the grapples are configured to move from the open position to the closed position to engage one of a plurality of bales of a vertically arranged stack which is adjacent to the load bed positioned in the second position;
wherein the first lift device is configured to move the load bed from the second position to the first position with the grapples engaged with the one bale of the stack such that the load bed and the vertically arranged stack are substantially horizontal to the ground;
a feed table supported by the primary chassis frame and configured to receive another of the bales thereon;
a second lift device supported by the primary chassis frame and configured to move the feed table having the another of the bales thereon between a first position where the first end of the feed table is adjacent to the primary chassis frame and a second position where the first end of the feed table is spaced from the primary chassis frame; and
wherein the feed table is tilted with respect to the primary chassis frame when the first end of the feed table is positioned at the second position to direct the another bale upon the feed table toward a feed mechanism which is located adjacent to a second end of the feed table, and wherein the feed mechanism is configured to disperse the contents of the another bale to the ground.

2. The apparatus of claim 1 further comprising a plurality of squeeze members adjacent to opposing lateral sides of the load bed, and wherein the squeeze members are configured to move from an open position to a closed position to engage the bales of the stack prior to and during movement of the load bed from the second position to the first position.

3. The apparatus of claim 2 wherein the first lift device is configured to move the load bed from the second position to the first position at a first moment in time, and wherein the first lift device is configured to move the load bed from the first position to the second position with the grapples and the squeeze members engaged with the bales of the stack at a second moment in time after the first moment in time.

4. The apparatus of claim 3 wherein the grapples and the squeeze members are configured to disengage the bales of the stack at a third moment in time after the second moment in time while the load bed is in the second position to place the bales of the stack in a vertical arrangement upon a supporting surface.

5. The apparatus of claim 1 wherein the grapple system is configured to move a plurality of additional individual bales which are located upon the ground at a plurality of moments in time to form another stack of the bales upon the load bed which is substantially horizontal with respect to the ground.

6. The apparatus of claim 1 further comprising:
a feed bed adjacent to the feed table; and
wherein the first lift device is configured to move the feed bed between a first position where a first end of the feed bed is adjacent to the primary chassis frame and a second position where the first end of the feed bed is raised elevationally above the first position and spaced from the primary chassis frame to tilt the feed bed and urge the another bale towards the feed table.

7. The apparatus of claim 6 further comprising a plurality of support rails which extend from the feed bed elevationally over the feed table and wherein the support rails are configured to support an additional one of the bales during movement of the feed table having the another bale thereon from the first position to the second position.

8. The apparatus of claim 6 further comprising a driver configured to move the feed table between a proximate position adjacent to the feed bed and a remote position spaced from the feed bed.

9. The apparatus of claim 8 wherein the second lift device is configured to move the feed table from the first position to the second position when the feed table is positioned at the remote position.

10. The apparatus of claim 6 wherein the grapples are provided in the closed position to stop movement of the another bale being urged towards the feed table at a position over the feed table.

11. The apparatus of claim 1 wherein the grapples and the feed table are located adjacent to a second end of the load bed.

12. A bale handling apparatus comprising:
a primary chassis frame;
a plurality of wheels coupled with the primary chassis frame;
a feed assembly supported by the primary chassis frame, and wherein the feed assembly is configured to retrieve a plurality of bales in a vertically arranged stack and to direct individual ones of the bales towards a feed mechanism at a plurality of moments in time, and wherein the feed mechanism is configured to disperse the contents of the individual bales to the ground;
wherein the feed assembly comprises:
a feed table coupled with the feed mechanism; and
a feed bed; and
a lift device is configured to move a first end of the feed bed from a first position where the first end of the feed bed is adjacent to the primary chassis frame to a second position where the first end of the feed bed is elevationally above the primary chassis frame to tilt the feed bed and direct the individual ones of the bales onto the feed table at the plurality of moments in time.

13. The apparatus of claim 12 wherein the lift device is configured to move the first end of the feed bed to provide the feed bed in a substantially vertical orientation with respect to the ground during the retrieval of the bales in the vertically arranged stack.

14. The apparatus of claim 12 further comprising another lift device configured to tilt the feed table to direct the individual ones of the bales upon the feed table toward the feed mechanism which is configured to disperse the contents of the individual ones of the bales to the ground.

15. The apparatus of claim 12 further comprising a driver configured to move the feed table having one of the bales thereon in a direction away from the feed bed.

16. The apparatus of claim 15 wherein the feed bed comprises a plurality of support rails configured to support another of the bales during the movement of the feed table in the direction away from the feed bed.

17. The apparatus of claim 12 further comprising a plurality of moveable grapples which are provided in a closed position to stop movement of the individual ones of the bales being directed onto the feed table at a position over the feed table.

18. The apparatus of claim 17 wherein the grapples are configured to move individual ones of a plurality of additional bales located upon the ground to the feed bed at a plurality of moments in time to stack the additional bales.

19. The apparatus of claim 12 wherein the movement of the first end of the feed bed from the first position to the second position causes the bales to slide towards the feed table.

20. The apparatus of claim 12 wherein the lift device is configured to move the first end of the feed bed to provide the feed bed in a substantially vertical orientation with respect to the ground during the retrieval of the bales and a substantially horizontal orientation with respect to the ground after the retrieval.

* * * * *